Feb. 11, 1969  J. C. GLASGOW  3,426,495
TIMBER TRUSS JOINT AND JOINT CONNECTOR
Filed Aug. 19, 1966

INVENTOR.
JAMES C. GLASGOW
BY
Christensen, Sanborn & Matthews
ATTORNEYS

United States Patent Office 3,426,495
Patented Feb. 11, 1969

3,426,495
TIMBER TRUSS JOINT AND JOINT CONNECTOR
James C. Glasgow, Seattle, Wash., assignor to Timber Imports, Inc., Edmonds, Wash., a corporation of Washington
Filed Aug. 19, 1966, Ser. No. 573,667
U.S. Cl. 52—641          2 Claims
Int. Cl. E04c 3/17; E04b 1/343

ABSTRACT OF THE DISCLOSURE

This invention provides an improved timber structure joint and joint connector therein comprising an elongated relatively thin-wall tubular body filled with solid cementitious filler imparting stiffness and strength to the connector. The ends of the tubular body beyond the filler are flared outwardly to form heads of a diameter exceeding that of the holes in the members through which the connector passes.

---

The present invention concerns timber trusses and more specifically improved truss joints and connectors.

An object hereof is to provide an improved truss joint connector permitting rapid precision fabrication of the predictable-strength trusses. Another object is to provide such a truss joint permitting relative folding of a preassembled truss structure so that it can be collapsed for convenient low-cost storage and transportation to the job site. Another object hereof is to devise such a truss joint and connecting member therein which will be relatively inexpensive and easy to install, whether in the factory or at the job site, yet will provide a strong and efficient load transfer connection between members which will not become loose, nor permit the joint to weaken materially with normal warpage and shrinkage of the wood members.

The improved truss joint and connector are herein illustratively described in the presently preferred form thereof; however, it will be recognized that certain modifications and changes therein with respect to details may be made without departing from the essential features involved.

As herein disclosed the improved pivoted truss joint comprises a relatively large-diameter hollow metal connector of tubular form snugly fitted into aligned matched truss member apertures and having ends which are flared outwardly so as to serve as retaining heads. These heads are force-seated under the flare-forming pressure against counterbored ends of the connector-receiving apertures so as to clampingly hold the wooden members tightly together. Shear strength and stiffness to resist deformation of the installed connector under truss load are enhanced by a hollow core filler of non-metallic cementitious material terminating short of at least one end of the connector. This filler permits use of relatively large-diameter thin-wall tubular material for the connector, permitting it to be inexpensive, light in weight, easily formed at the ends, and capable of spreading load over relatively large bore surface areas in the wood, without distortion and attendant load redistribution under stress. Such filler may be inserted before or after connector installation as desired, but preferably terminates short of one end of the connector so as to permit forming or reforming of the connector ends.

These and other features, objects and advantages of the invention will become fully evident from the following description by reference to the accompanying drawings.

Figure 5:
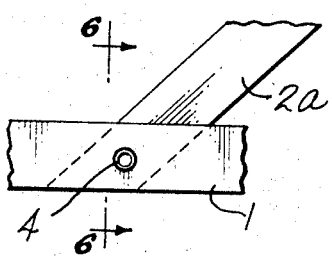
Figures 6, 7, 8:
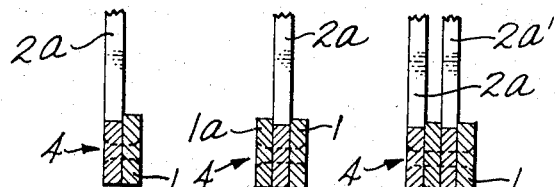

FIGURE 5 is a side elevational view of an individual pivotal joint, and FIGURES 6, 7 and 8 are sectional views of the same, taken approximately at the line 6—6 of FIGURE 5, showing such a joint applied to trusses consisting of two, three, and four members, respectively, and suggesting that the joint concept of this invention may be applied to trusses of varying types and having varying numbers of wood members.

The truss illustrated is one which has a straight lower chord member 1 that, in use, is subject to tensional stress, and an upper chord that is composed of two members 2a and 2b that abut at their inner ends and, together, are subject to compressional stress. This, of course, is an elemental form of truss, and the principles of this invention can be applied to many additional and more complex forms. The tensionally-stressed chord member 1, ideally, is continuous from end to end, but can be made up of two or more members joined end to end. At 32 the compressionally-stressed end-abutted chord parts 2a and 2b join the upper end of a king post 3 that is secured at 31 to the chord member 1.

Figure 1:
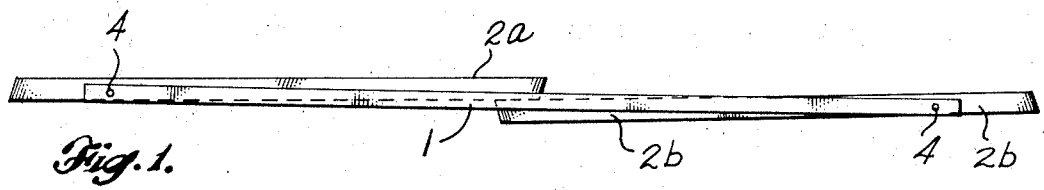
FIGURE 1 is a side elevational view of the truss structure in folded condition.
Figure 2:
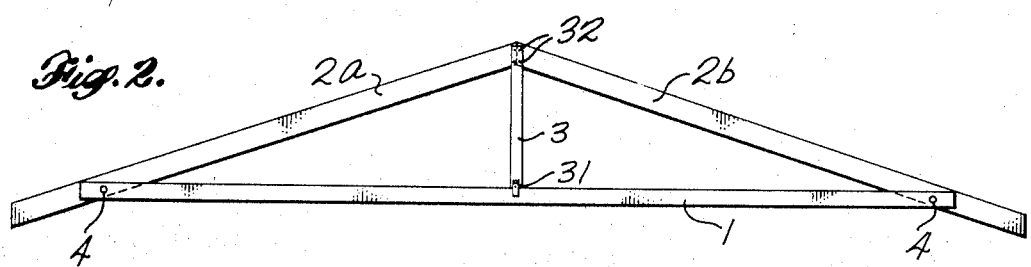
FIGURE 2 is a side elevational view of the same after it has been set up, ready for installation.
Figure 3:
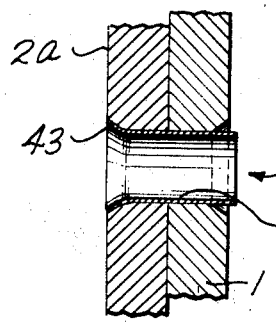
FIGURE 3 is a cross-sectional view of a preferred joint structure in an initial stage of formation.
Figure 4:
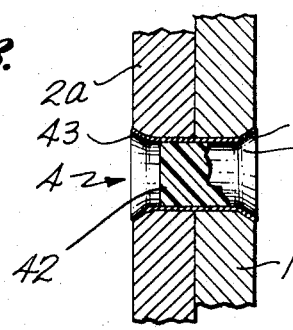
FIGURE 4 is a similar view showing the completed joint structure.

The outer end of the chord member 2a is joined to the corresponding outer end of the chord member 1 by a novel pivotal connection at 4, and the opposite outer end of the chord member 1 is joined to the chord memmer 2b, similarly, by a similar pivotal connection 4. By this arrangement, the entire truss, prior to installation of the king post 3, can be folded down into the condition shown in FIGURE 1, wherein the parts 2a and 2b overlap and are approximately aligned with the chord member 1 and with each other. The king post 3 is nailed or otherwise secured to the inner ends of truss parts 2a, 2b, at 32, when in condition for use. While diagonal and intermediate upright braces have not been illustrated, it is clear that these could be added if desired when the truss structure is ready to be set up, or thereafter.

It is important for the truss joints between member 1 and members 2a and 2b to carry truss loads without undue stress concentrations in the wood fibers adjacent to the connecting elements which could initiate a progressive failure condition and truss deformation. It is therefore important that the connecting elements be of relatively large diameter and fitted snugly against the walls of the holes in the wood, and especially that the snugness of fit be largely maintained throughout the life of the structure. Humidity cycles, load cycles, natural shrinkage or warpage in the wood, and the possibility of human carelessness in the assemblage of the truss are all factors for which allowance should be made in the proper design of the joint. While cross-sectional diameter of the connector should be large and its stiffness and shear strength adequate against rated loads, design economics and weight savings indicate that the amount of metal used should be minimized.

To the ends mentioned the pivotal joints 4 are provided by boring matched holes in the truss members centered on their intended pivot axes and through each of these two sets of holes a metal tubular cylindrical connector 41 is inserted with a snug fit. The outer ends of the matched holes of each set are counterbored to form a recessed seat, preferably of taper-rounded form to accommodate correspondingly shaped flared ends 43 and 44 of the connector 41. In some cases one end 43 may be preformed or headed prior to assembly of the truss. Alternatively the connector ends may both be flare-formed after insertion into the matched holes in the truss members. In either case at least one end is flared after insertion so as to exert permanent clamping pressure at both ends of the connector against the counterbore surfaces of the respective holes. By forming one or both heads on the connector 41 with pressure, contracting the intermediate length of the connector, the formed heads draw and hold the truss members snugly together. The operation may be accomplished by use of any suitable tools. When installed the connector ends are preferably approximately flush with the truss member outer surfaces where they will not complicate stacking of trusses folded down for storage or shipment nor present an obstacle to use of the truss in close proximity to or lateral contact with adjacent parts of a structure.

As will be noted the wood fibers need not be deformed or crushed by installation of the connectors 41. Moreover, the relatively large-diameter thin-wall tubular stock used in the connector can be made and installed inexpensively inasmuch as no complicated forming or manufacturing operations are involved. The generally taper-rounded heads formed by flaring of the tubular ends need not be bent through an unduly large angle, so that the forming operation is simple and the tooling requirements minimal; moreover, relatively inexpensive thin-wall metal tubing stock, such as electrical conduit stock, may be used as the body material, without any severe requirement for a high malleability coefficient. Yet the retention capability of the connector heads to resist separation of the truss members is wholly adequate inasmuch as separation forces are not major in the truss joint when the connector fit is a snug one.

In its preferred form particular advantages of the joint structure arise from use of a solid cementitious filler material 42 in the tubular connector. Since the greatest or most critical type of loading to be assumed by the connector is in shear, this solid filler adds greatly to the shear strength and stiffness against distortion of the connector, and it makes possible use of relatively thin-wall tubular stock for the connector body. This in turn makes formation of the connector heads even easier and thereby further simplifies tooling requirements. Epoxy resin, portland cement light aggregate, plaster of Paris, or any of various other cementitious filler materials may be used for the purpose. Preferably a firm bond with the internal wall of the tubular connector body is desired so as to avoid separation therebetween. However, a snug fitting unbonded filler body may be used as an insert if desired, in which case attention should be given to use of a filler material which will not shrink after being snugly fitted in the connector body.

Preferably the filler body extends both ways from the truss member interface toward both ends of the connector by a sufficient distance that the major portion of the connector's length is stiffened and strengthened by it throughout all regions wherein increased stiffness and strength is desired. If desired the filler may be applied after the connector body is installed and its ends formed. However, in practice it is more convenient and less expensive to apply the filler material at the factory so that the connector is complete except for the final forming in situ. In such case the filler terminates somewhat short of the inner ends of the connector headable end portions so that it will not interfere with the flaring operation.

In FIGURES 1 to 6 the truss structure has been shown and described as consisting of a simple A-type truss. However it will be evident that the same principles are equally well adapted for incorporation in other truss forms, including greater numbers of members interconnected by the same joint connector. A truss structure wherein the element 1 is doubled, as at 1a, is shown in FIGURE 7, and in FIGURE 8 the truss element 2a has been doubled at 2a', and the element 1 is also doubled. It follows that the truss members may include as many such individual elements as may be needed for the requirements of the particular truss structure to be produced. In any such case, the tube is simply made long enough to extend through and to fit snugly within all the several elements of the truss that are abutted.

These and other aspects of the invention will be evident to those skilled in the art having reference to the illustrated embodiment of the invention.

I claim as my invention:

1. In combination, a structure comprising at least two wooden structural members mutually overlapping, and pivotally joined together by an elongated connector of round cross-section passed through registering apertures in the structural members, said connector comprising a metallic elongated, relatively thin-wall tubular body formed with integral outwardly flanged ends larger than the apertures and a cementitious solid filler core therein extending over at least an intermediate portion of the length of such connector so as to materially increase its stiffness and shear strength.

2. A pivotal connector for foldable truss structures comprising wooden members having connector-receiving aligned apertures therein, said connector comprising an elongated tubular member of metal which is sufficiently malleable to permit flaring the ends thereof to form retaining heads on the connector, said tubular member having a nonmetallic cementitious solid filler core therein extending over at least an intermediate portion of the length of such connector so as to materially increase its stiffness and shear strength and terminating short of at least one end portion thereof to be flared.

References Cited

UNITED STATES PATENTS

| 295,593 | 3/1884 | Thayer | 85—39 |
| 1,232,168 | 7/1917 | Aronson | 52—641 |
| 2,293,491 | 8/1942 | Cox | 85—85 |
| 2,385,142 | 9/1945 | Lank | 52—639 |
| 2,536,353 | 1/1951 | Cooper | 85—77 |

FOREIGN PATENTS 1,385,350 11/1964 France.

BOBBY R. GAY, *Primary Examiner.*

R. D. KRAUS, *Assistant Examiner.*

U.S. Cl. X.R.

287—101